United States Patent

Cleland

[11] Patent Number: 5,725,028
[45] Date of Patent: Mar. 10, 1998

[54] TRUNK LINE

[76] Inventor: James M. Cleland, 4200 Via Norte St., Cypress, Calif. 90630

[21] Appl. No.: 645,425

[22] Filed: May 13, 1996

[51] Int. Cl.$^6$ .................................................. F16L 9/14
[52] U.S. Cl. ........................ 138/149; 138/111; 138/137
[58] Field of Search ............................... 138/149, 115, 138/116, 103, 111, 137, 138

[56] References Cited

U.S. PATENT DOCUMENTS

| | | | |
|---|---|---|---|
| 3,529,632 | 9/1970 | Johns | 138/149 X |
| 4,194,536 | 3/1980 | Stine et al. | 138/149 |
| 4,307,756 | 12/1981 | Voigt et al. | 138/149 |
| 4,399,319 | 8/1983 | Zinn | 138/149 X |
| 4,570,680 | 2/1986 | Ratti | 138/149 |
| 4,606,957 | 8/1986 | Cohen | 138/149 X |
| 4,653,541 | 3/1987 | Oehlschlaeger et al. | 138/149 X |
| 4,772,507 | 9/1988 | Leo, Jr. et al. | 138/149 X |
| 5,400,602 | 3/1995 | Chang et al. | 138/149 X |

*Primary Examiner*—Patrick F. Brinson
*Attorney, Agent, or Firm*—Georges A. Maxwell

[57] ABSTRACT

An improved trunk-line structure comprising a plurality of elongate beer lines and glycol lines made of flexible plastic tubing in parallel juxtaposition; an elongate sheath of high tensile strength, tear resistant, flexible plastic material is tightly engaged about and extending longitudinally of the assembly of beer and glycol lines and holds the lines in set position relative to each other; an elongate tube of soft, flexible, resilient, thermal insulating foam plastic material is engaged about and extending longitudinally of the sheath; and, a skin of inhervious, soft, flexible and resilient plastic material is positioned about and extending longitudinally of the tube, the plastic materials of which the parts of the trunk-line structure are made have low indexes of heat conductivity.

15 Claims, 3 Drawing Sheets

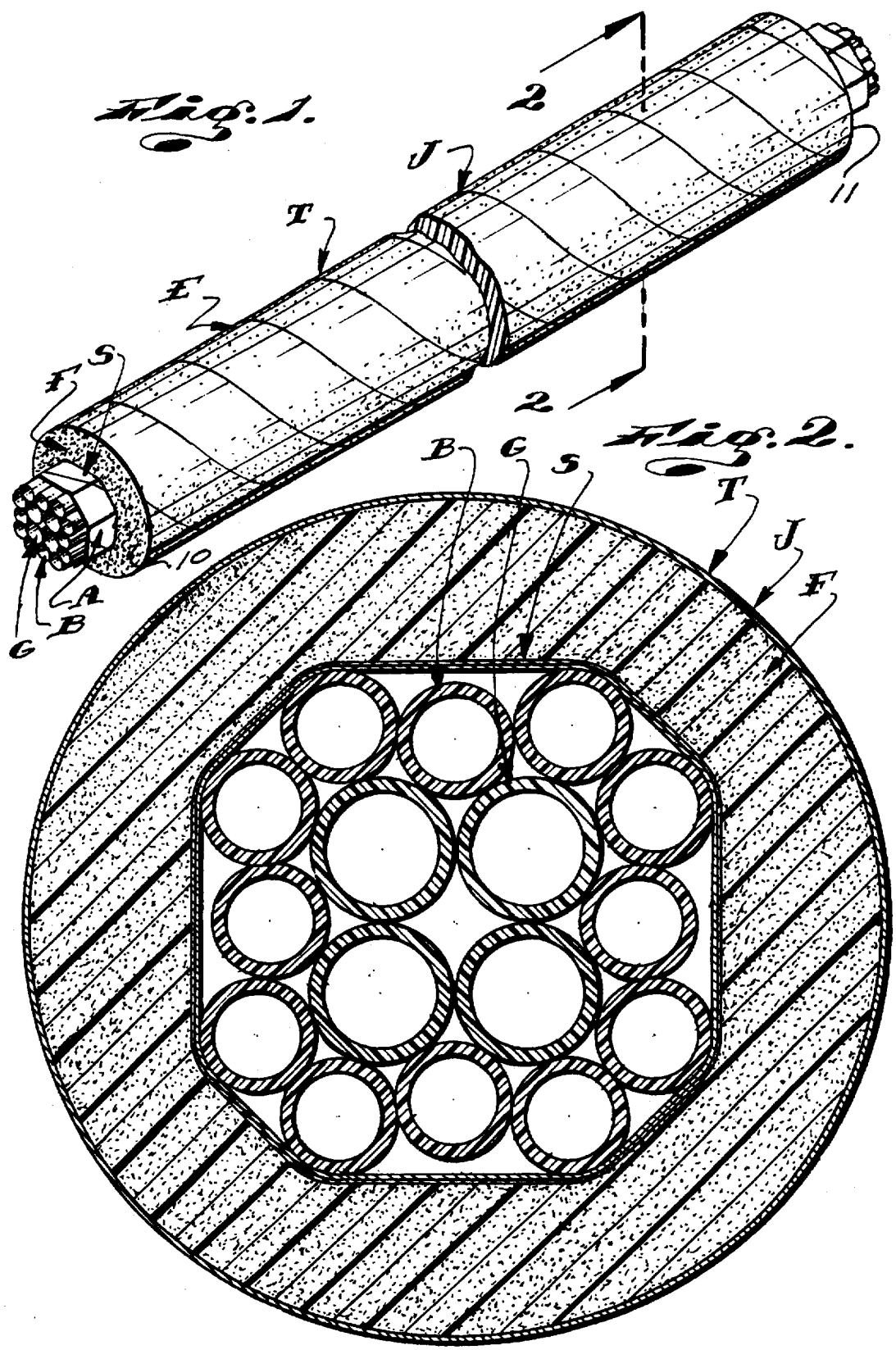

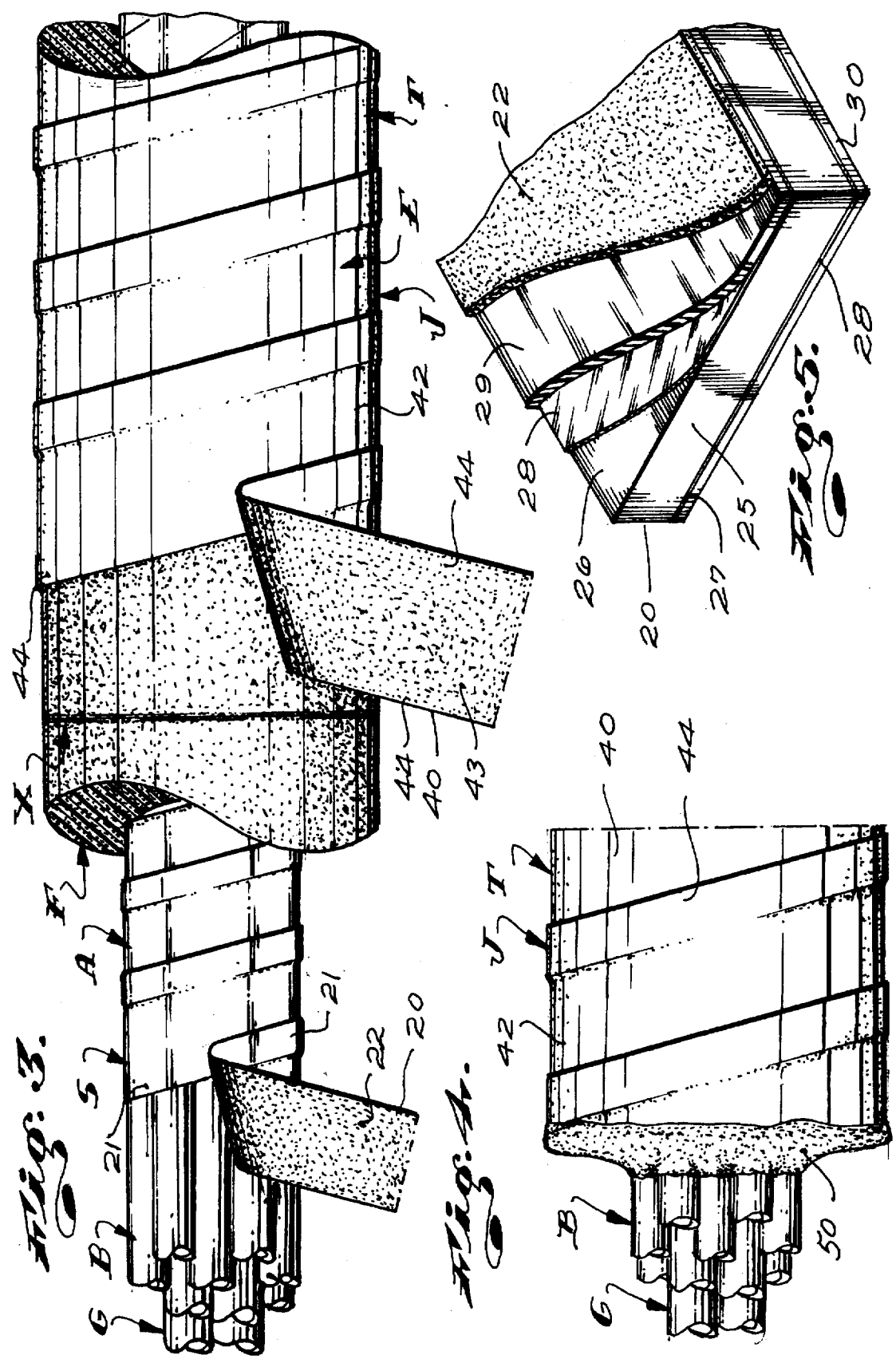

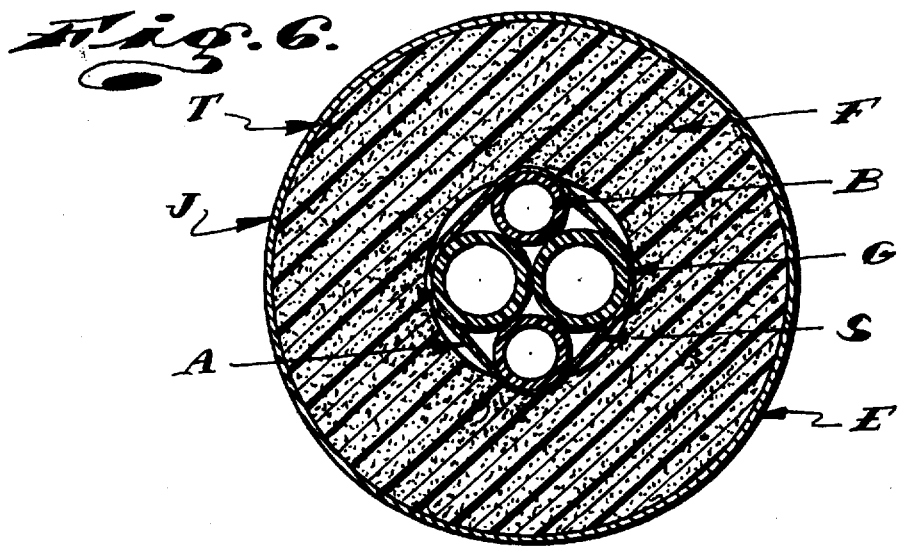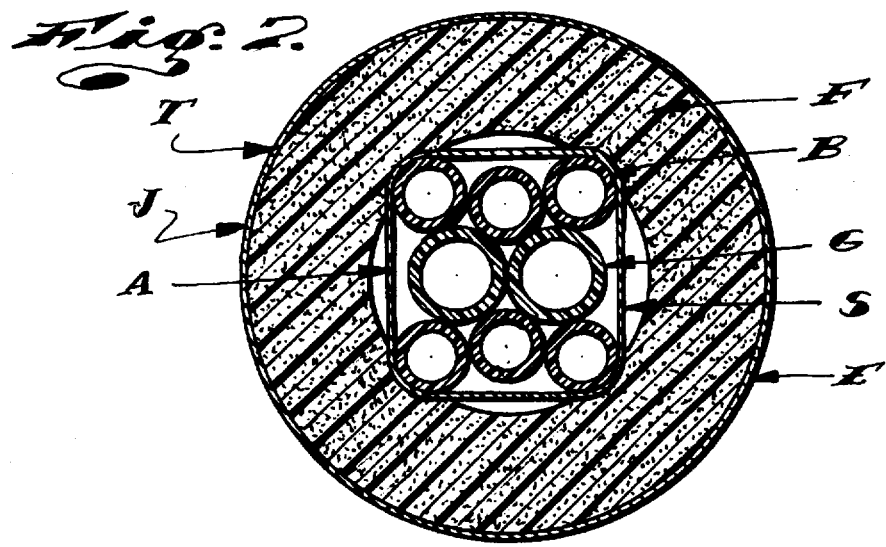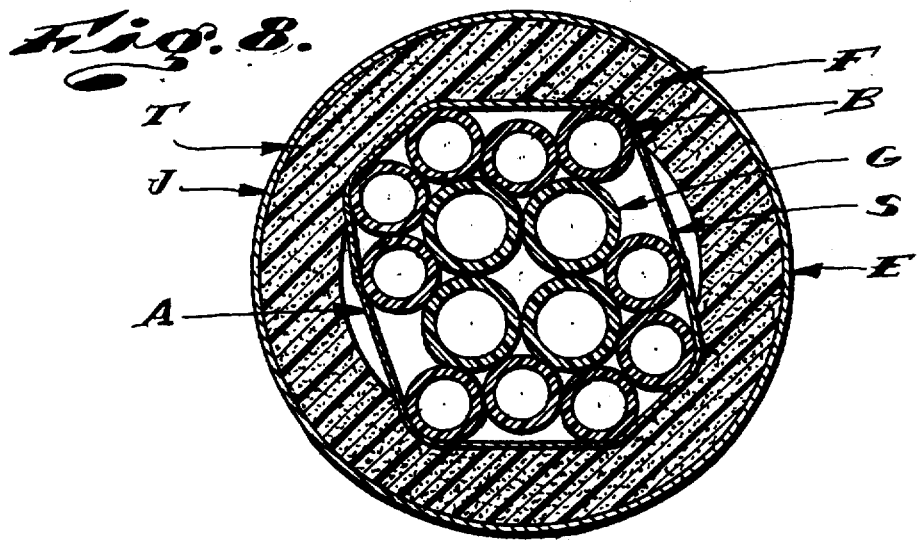

TRUNK LINE

BACKGROUND OF THE INVENTION

In the art of commercially vending and dispensing beer; beer to be dispensed is commonly supplied in kegs. The kegs of beer are stored in refrigerated cold rooms where the kegs and the beer therein are chilled to, for example, about 40° F. The beer is conducted through elongate, flexible, tubular beer lines from the kegs and from within the cold rooms to dispensing valves that are located at beer serving stations that are remote from the cold rooms. The dispensing valves are typically carried at the upper ends of upwardly projecting tower structures that are mounted atop beverage serving counter tops.

In practice, the distance between the kegs in the cold rooms and the dispensing valves varies from as little as 20 feet to 200 feet or more. The beer lines extending between the kegs and the valves are laid in torturous courses through cabinetry and the like and are exposed to ambient temperatures that are typically about 72° F.

Beer is typically dispensed from dispensing valves, a serving at a time, into suitable drinking vessels, such as drinking glasses. A typical serving is ten ounces and the time that lapses between the dispensing of each serving can vary from several seconds to several hours. As a result, the beer flows through the lines at a rather slow rate and if steps are not taken to prevent warming of the beer, it will warm from 40° F. to 72° F. from the time it leaves the kegs to the time it reaches the dispensing valves.

It is important to note that substantial quantities of carbon dioxide gas is entrained in beer. When beer is chilled to a low temperature the gas entrained therein is quite stable and tends to remain entrained in the liquor of the beer. As the temperature of beer increases the gas entrained therein becomes increasingly unstable at an exponential rate and tends to separate from the liquor. When beer is dispensed it is agitated and the gas escaping from the liquor forms foam that is not merchantable and must be poured off to waste. The profits to be made from the sale of beer diminish proportionally with the amount of beer that is poured off to waste in the form of foam.

Beer at 40° F. is close to that temperature where so much foam will be generated when it is dispensed from a dispensing valve into a glass that very little of the potential profit from the sale of that beer will be realized.

When beer is at a temperatures in excess of 50° F. the gas entrained therein is so unstable that it cannot be dispensed through valves and into glasses without so much foam being generated and poured off to waste that an economic loss will likely occurred.

As a result of the above, the prior art has long provided elongate flexible thermal insulating jacket structures, called "trunk-lines" that are engaged about the beer lines to prevent or slow warming of the beer that flows through the beer lines.

The trunk-lines provided by the prior art are rather simple and unsophisticated structures. They include elongate, large diameter, thermal insulating tubes of soft flexible foam plastic through which the beer lines are extended or laid. The wall thickness of the foam plastic tubes varies from about ¾ of an inch to 1 inch and the tube stock is provided in lengths that vary from six feet to ten feet. The assembly of foam plastic tube sections that make up prior art trunk lines are wrapped with duct tape to maintain the tube sections in end to end butted engagement with each other and to prevent excessive tearing and gouging of the foam plastic tube as the trunk-lines are worked upon, during installation and during subsequent use.

In another and more sophisticated form of trunk-line provided by the prior art and through which a multiplicity of beer lines are laid, the assembly of elongate parallel and adjacent beer lines are wrapped with aluminum foil that serves to absorb and then conduct and spread heat (both hot and cold) uniformally about the assembly of beer lines and to thereby modulate the fluxations in temperature that occur as beer is caused to intermittently caused to flow through the several beer lines.

In newly manufactured and installed trunk-lines in which the beer lines are wrapped with aluminum foil, the aluminum foil enhances the thermal insulating characteristics of the trunk-lines by reflecting radiant heat. This advantage is very short lived since aluminum foil in such environments rapidly oxidizes and degrades to an extent that it has little or no heat reflecting capacity. In most instances, the heat reflecting capacity of aluminum foil, in trunk-lines, is substantially extinguished in three or four months of regular use.

The aluminum wrappings in the above noted trunk-lines are established of helically wound ribbons of aluminum foil, the edge portions of which are in overlapped relationship with each other. Due to the vary low tensile strength and extremely low tear resistance of aluminum foil, the ribbons of aluminum foil are necessarily rather loosely wrapped so as not to subject the foil to tearing forces and so that the lapped portions thereof are in substantial free running engagement with each other. As such, the aluminum foil wrapping does not serve to create any form of barrier or seal through which moisture and water within the trunk-lines might not be free to move.

Due to the extremely fragile nature of the aluminum foil wrappings about the beer lines, some of those in the prior art have resorted to wrapping the aluminum foil wrap with cellophane ribbon to protect and prevent tearing the aluminum foil wrap during assembly of the trunk lines. The cellophane ribbons are rather loosely wrapped about the aluminum wraps so as not to prevent relative slipping and/or sliding of the lapped portions of the aluminum foil. No seal is established by the cellophane.

The above noted prior art trunk-lines provide sufficient thermal insulation to normally prevent excess warming of beer when the trunk-lines are little no more than 30 feet long.

In those instances where trunk-lines are near or in excess of 50 feet long the prior an has found it necessary to resort to the provision and use of what has become known in the art as "glycol machines" to assist in preventing or minimizing heating of the beer that is conducted through the beer lines within the trunk-lines. The glycol machines include electric powered refrigeration machines, glycol solution heat exchanger tanks through which expansion coils of the refrigeration machines extend, elongate, flexible, glycol recirculating lines of plastic tubing with upstream and downstream ends connected with the tank; and, recirculating pumps connected in the glycol lines to affect constant recirculation of the glycol solution through the glycol lines and the tanks. The glycol lines have delivery or upstream and return or downstream portions that are arranged to extend parallel and in heat transfer contact with at least some of the beer lines within the trunk-lines. Typically, the glycol solution is chilled to about 27° F.; well below the freezing temperature of beer.

Both beer and glycol solution have low coefficients of heat conductivity and the plastic of which the glycol and beer lines are made have extremely low coefficients of heat conductivity. As a result, though the glycol might be chilled to, for example 27° F. little heat is absorbed and carried away by it and the glycol machines, with their glycol recirculating lines, only serve to slow the rate at which the beer flowing through the beer lines, within the trunk-lines, warms. As a result of the foregoing in many instances where the trunk-lines are in excess of 100 feet long, secondary heat exchanger means are often provided between the trunk lines and the dispensing valves to draw the temperature of the beer down to acceptable levels.

A major shortcoming of those trunk-lines that the prior art provides resides in the fact that their useful life is unduly shortened by water damage. The water damage is caused by moisture in the air that condenses on and about the glycol and beer lines within the trunk-lines and that collects therein as free standing water. The water in the trunk-lines enters and is drawn into the cellular foam plastic insulating material of the thermal insulating tubes and diminishes or eliminates the thermal insulating characteristics thereof and results in the rapid disintegration of the cellular structure of the tubes. In the case of those trunk-lines through which glycol recirculating lines extend, the above adverse effects are greatly aservated by repetitious freezing and thawing of the water about the glycol lines and within the trunk-line structures.

In addition to the above, the exteriors of the prior art trunk-lines are not hermetically sealed. The porous duct tape that is wrapped about them is such that moisture from the air and free standing water, at the exterior the trunk-lines, are absorbed by the foam plastic and rapidly work adverse effects thereon.

In addition to the foregoing, water that is let to collect in trunk-lines supports the growth of algae, mold, germs and the like that render the trunk-lines serious health hazards. As a result of the foregoing it is not infrequent that those trunk-lines provided by the prior art become water logged, putrefying masses of material about the beer lines shortly after their installation.

Another major shortcoming of those trunk-lines provided by the prior art resides in the fact that the longitudinally extending assemblies of beer and glycol lines are essentially unrestrained and are free to move and shift about within the trunk-lines. The only thing that contains the beer and glycol lines is the extremely weak and very fragile aluminum foil that is loosely wrapped about them and/or the soft, flexible and resilient foam plastic walls of the insulating tubes through which they extend. As a result of the foregoing, as the trunk-lines are turned about, bent, and otherwise worked upon during installation and thereafter, the beer and glycol lines within them are caused to shift and move about relative to each other, in random patterns, throughout the lengths of the trunk-lines. In some instances the glycol lines will occur in juxtaposition one side of the assembly of lines; in spaced relationship at opposite sides of the assembly of lines; or, in any other possible arrangement within the assembly of lines.

The advertising literature of some manufacturers of trunk-lines include graphics that show the glycol and beer lines in neat and attractive arrangements. It has been found that in practice, while the beer and glycol lines in those prior art trunk-lines might be in those patterns shown in the manufacturer's literature, at the ends of the trunk-lines the arrangements of those lines throughout the lengths of the trunk-lines and between the ends thereof varies and changes materially. There is nothing in those trunk-lines to hold and maintain the beer and glycol lines in any one predetermine, fixed, arrangement or pattern.

Trunk-lines of the character here concerned with must be capable of being bent about radiuses of from two to three feet. In the case of prior art trunk-lines with a multiplicity of beer lines and glycol lines extending through the centers thereof, when those trunk-lines are bent as noted above, the beer and/or glycol lines occurring radially outward from the center line of the bent or curved trunk-lines move inwardly and the beer and/or glycol lines occurring inward of the center line of the trunk-lines move outwardly within the trunk-lines. The inwardly and outwardly moving lines displace each other and assume position on a single plane that extends parallel with the axis of curvature of the trunk-lines. When thus positioned, the beer and glycol lines are randomly arranged relative to each other and the glycol lines are rendered less effective to absorb heat from the beer lines and carry it away.

As a result of the foregoing, the heat insulating characteristics of the prior art trunk-lines is, as a general rule, less effective where those trunk-lines are bent to extend around corners and the like. As a result of the forgoing a trunk-line of a given length that is bent four or five times about tight radii is notably less effective than a trunk line, of the same length that is not bent.

The above is due in part to the fact that the opposing and abutting ends of the foam plastic tube sections that make up the thermal insulating tubes often occur where the tubes are bent about tight radiuses and are therefore drawn apart. The duct tape wrapped about the tubes to hold them in end-to-end relationship is simply insufficient to hold and prevent the tube sections from parting as noted.

OBJECTS AND FEATURES OF THE INVENTION

It is an object of my invention to provide an improved trunk-line having notably superior thermal insulating characteristics and notably longer useful life expectancy than those trunk-lines that are provided by the prior art.

It is an object and feature of the present invention to provide a trunk-line that includes an elongate insulating tube of soft, flexible thermal insulating foam plastic; an assembly of elongate juxtapositioned liquid conducting beer and glycol lines of flexible plastic tubing extending longitudinally through the tube; an elongate tubular sheath of thermal insulating material about the assembly of lines and hermetically sealing between the assembly of lines and the tube; and, an exterior skin of water impermeable, soft, flexible and elastic material about and hermetically sealing the exterior of the tube.

It is another object and a feature of the invention to provide an improved trunk-line of the general character referred to above wherein the beer and glycol lines are arranged in predetermined position relative to each other and wherein the sheath is established of a material having great tensile strength and great tear resistance and is tightly engaged with and about the assembly of beer and glycol lines and maintains those lines in their predetermined set position relative to each other throughout the length of the trunk-line.

Yet another object and feature of the present invention is to provide an improved trunk-line of the general character referred to above wherein the sheath is established of an elongate ribbon of thin, flexible, substantially nonelastic thermal set plastic with inside and outside surfaces and that has a coating of pressure adhesive on the inside surface and that is wrapped helically about the assembly of beer and glycol lines with its opposite side portions in lapped engagement and sealingly bonded together by the pressured adhesive and wherein the pressure adhesive bonds the ribbon to the surfaces of the lines it contacts.

Another object and feature of the invention is to provide an improved trunk-line of the general character referred to above wherein aluminum is vapor deposited on the inside and outside surfaces of the ribbon to reflect radiant heat impinging upon the sheath from within and from without the sheath.

Another object and feature of the present invention is to provide an improved trunk-line of the general character referred to above wherein the skin about the exterior of the thermal insulating tube of foam plastic is established of an elongate tape of soft, flexible and elastic impervious plastic with inside and outside surfaces, a pressure adhesive coating on the inside surface. The tape is wrapped helically about the exterior of the tube with its opposite side edge portions in lapped engagement with each other and hermetically sealed and bonded together by the pressure adhesive coating and the inside surface of which is bonded to the exterior surface of the tube by the pressure adhesive coating.

It is yet another object and feature of the present invention to provide an improved trunk-line structure of the general character referred to above wherein the thermal insulating tube of foam plastic is made up of elongate sections of foam plastic tube stock and wherein the opposing and abutting ends of adjacent sections of tube stock are bonded together to establish a unity tube.

Finally, it is an object and a feature of my invention to provide a new and improved trunk-line of the general character referred to above wherein moisture ladened air in the spaces within the sheath and between the beer and glycol lines is evacuated from the sheath and is replaced with dry gas and wherein the ends of the trunk-line are hermetically sealed with a sealing compound.

The foregoing and other objects and features of my invention will be apparent and will be fully understood from the following detailed description of typical preferred forms and embodiments of the invention throughout which description reference is made to the accompanying drawings.

DESCRIPTION OF THE DRAWINGS

FIG. 1 is an isometric view of a trunk-line embodying the invention;

FIG. 2 is an embodying cross-reactional view taken as indicated of line 2—2 on FIG. 1;

FIG. 3 is a longitudinal view of a portion of the trunk-line with part broken away to better illustrate the invention;

FIG. 4 is a view of an end portion of the trunk-line;

FIG. 5 is an enlarged isometric view of a piece of a section of the film that is used to established the sheath of the trunk-line: and;

FIG. 6, 7 and 8 are cross-sectional views that show my new trunk-line structure with different numbers and arrangement of lines.

DETAILED DESCRIPTION OF THE INVENTION

In FIGS. 1 and 2 of the drawings I have illustrated one preferred form and embodiment of my new trunk-line T. The trunk-line T is shown with 12 elongate beer lines B, two pairs (four) of glycol recirculating lines G and an elongate sheath S about the assembled beer and glycol lines. The lines B and G and the sheath S establish a unitary sub-assembly A.

The trunk-line T next includes an outer thermal insulating jacket structure J. The jacket structure includes a tube of soft, flexible and resilient thermal insulating foam plastic tube F through which the sub-assembly A extends and an exterior skin E.

In practice, to facilitate economical manufacturing and commercial exploitation of my new trunk-line I provide trunk-lines with 2, 4, 8, 10, 12 and 16 beer delivery lines B. The trunk-lines with 2, 4 and 6 beer delivery lines B have one pair of glycol recirculating lines G; the trunk-line with 8 or more beer lines B include two pairs of glycol recirculating lines G.

My new trunk-line is produced in lengths to order. Trunk-lines less than 10 feet in length and greater than 200 feet in length are produced.

One end, 10, of the trunk-line T is the upstream end, where the beer lines B connect with kegs (not shown) of beer and the other end, 11, is the downstream end where the beer lines connect with related dispensing valves (not shown). The ends of each pair of glycol lines G at the downstream end of the trunk-line can be integrally connected with each other or are otherwise suitably connected with each other. The ends of each pair of glycol lines at the upstream end 10 of the trunk-line connect with the heat exchanger of a related glycol chiller machine (not shown). A pump (not shown) is suitably engaged in the glycol lines where they connect with the heat exchanger. One of the lines of each pair of glycol lines G is a delivery line through which glycol flows downstream through the trunk-line and the other is a return line through which the glycol circulates back and upstream through the trunk-line.

The provision and use of two and possibly more pairs of glycol lines is resorted to where it is desired to increase the surface area of those lines and/or when it is desired to slow the rate of flow of glycol through the trunk-line. Multiple pairs of glycol lines are also resorted to when to do so enables the assembly of beer and glycol in a more beneficial pattern.

In accordance with common practices, the beer lines are established of ½" OD, ⅜" ID plastic tubing and the glycol lines are established of ⅝" OD and ½" ID plastic tubing. The plastic of which the lines are made is especially formulated to handle acholic beverages, under pressure, and has a very low coefficient of heat conductivity.

The several elongate, flexible, plastic lines B and G are arranged in parallel juxtaposition with the four glycol lines G centrally positioned and in a substantial square pattern. The twelve beer lines B are positioned circumferentially about the glycol lines, as shown in FIG. 2 of the drawings. Each line is in bearing heat conducting contact with each adjacent line throughout the length of the trunk-line. The foregoing special arrangement of the several line B and G is attained by advancing the lines through special ported fixtures during assembly thereof.

The assembly of lines B and G, arranged as noted above, are wrapped and bound together in assembled relationship by the sheath S as they advance from the fixtures.

The sheath S is established of thin, flexible, nonelastic, impervious ribbon stock 20 of high tensile strength, tear resistant, thermal set plastic. The ribbon 20 is wrapped helically about the assembly of lines B and G with its opposite side edge portions 21 in overlapped engagement with each other. The radially inwardly disposed inner surface of the ribbon is preferably provided with a pressure adhesive coating 22 that sealingly bonds the overlapping edge portions of the ribbon together and that bonds the ribbon to the outer most edges of the several beer lines B it contacts to hold each of those lines in its set position relative to all of the other lines.

In practice, the ribbon 20 is about 6 mm thick and is 4 inches wide. The opposite 1" edge portions of the ribbon are in overlapping engagement with each other.

It is to be noted that the ribbon, in addition to bonding with and securely holding and therefore bundling the tubes together, establishes a hermetic seal about the bundle of tubes.

Referring to FIG. 5 of the drawings, in one preferred carrying out of the invention the ribbon 20 includes a core or central laminate 25 with inside and outside surfaces. Thin deposits of heat-reflecting aluminum 28 are vapor deposited on the inside and outside 26 and 27 surfaces of the ribbon 20'. Thin inside and outside laminates 29 and 30 of similar plastic are applied to and overly the aluminized inside and outside surface of the laminate 25 and. The laminates 29 and 30 protect the aluminum deposits from those elements that would cause the aluminum to degraded or otherwise lose its reflective properties. Finally, the coating 22 of pressure adhesive 23 is applied the inside surface of the laminate 29.

The above noted laminated material, of which the ribbon 20 is made, is commercially available and is made to order by Parsec Inc. of Dallas, Tex. It is effective to reflect and therefore block the passage of in excess of 95% of all radiant heat the impinges upon its inside and outside surfaces.

It is very important to note that the vapor deposited aluminum 28 on the surfaces of the ribbon 20 effectively reflects radiant heat but contains insufficient amounts of metal to absorb and/or conduct what is measurable amounts of heat (within that range of heat that is of concern in the art which the present invention relates).

It is understood that the protective laminates 29 and 30 applied to the aluminized surfaces of 20 prime are but a fraction of a mm in thickness and are bonded to the laminate 25 so that delamination does not occur.

It is to be particularly noted that the aluminized radiant heat reflecting ribbon is made of plastic material having a very low index of heat conductivity and qualifies as and can be said to be a heat insulating ribbon. Accordingly, it is notably distinct in nature and in character from aluminum foil which is used in the prior art as a heat conducting material in trunk-lines.

The outer jackets structure J of my new trunk-line structure includes the above noted elongate, cylindrical, tube F of soft, flexible and elastic thermal insulating foam plastic. While the foam plastic tube stock that is used to make the tube F is readily available in standard sizes and lengths it can be and often is produced to the users specifications, at no added cost. In the case at hand and for the purposes of this disclosure the tube F is 4 inches in outside diameter, has a wall thickness of ¾ inch and has a 2 inch diameter central opening or bore. It is made up of six foot long tube sections.

The foam plastic material of which the tube is established is preferably a non-interconnected cellular foam. However, in practice, the walls of the plastic material that define the cells are extremely thin and so weak that many adjacent cells are open to each other and many small through passages through which small amounts of moisture laden stir, water and the like can pass are to be found throughout the material. During installation of the trunk-line and during the regular wear and tear to which the trunk-line is subjected the thin walls in the foam material are stressed and often break down to an extent to where it becomes quite water permeable. The forgoing is particularly true when the foam material is worked upon in the presence of water. Under those conditions the water enters the cells and is forcibly advanced through cell walls from cell to cell.

The use of available non-interconnected cellular foam plastics that are sufficiently strong and durable so that they will not break down or degraded in a manner set forth above have been found to be unsatisfactory since they are considerably heavier, more costly and are so hard and stiff that they cannot be bent or otherwise worked upon to the extent that is necessary to put trunk-lines, in which they might be used, to their intended use.

In the preferred carrying out of my invention, the opposing, abutting ends of the several sections of tube stock going to make up the tube F of my new trunk-line structure are suitably bonded or cemented together, as indicated at X in FIG. 3 of the drawings, to establish a unitary tube structure. Bonding together of the adjacent ends of related sections can be effected by application of a suitable solvent or by the application of a suitable bounding compound, such as silicon sealing compound.

In practice, the several sections of tubular foam plastic stock used to establish the tube F are easily and conveniently slidably engaged about and moved longitudinally of their related sub-assembly A by a process that includes expanding the tube sections radially outwardly by inflating the sections with compressed air. When the sections are in place about the sub-assembly A the sections are allowed to deflate and move radially inwardly into intimate engagement with and about the sub-assembly A.

The jacket structure J next includes an exterior skin E of impervious, flexible and elastic plastic material that is highly tear resistant. The skin hermetically seals the exterior of the Tube E and protects the foam plastic material of which the tube is made from being torn, gouged or otherwise mutilated when the trunk-line structure is being worked upon and is put to its intended use.

In the preferred carrying out of the invention, the skin E is established of a continuous length of polyethylene plastic tape 40 that is about five mm thick and four inches wide. The tape has radially inwardly and outwardly disposed inside and outside surfaces 41 and 42 and has a pressure adhesive coating or backing 43 applied to its inside surface. The tape is helically wound about the tube F with its opposite side edge portions 44 in overlapping engagement with each other. The pressure adhesive backing bonds and hermetically seals together the overlapping edge portions 44 of the tape and bonds the tape to the exterior surface of the tube.

In practice, I have found that common, plastic electricians tape is effective for establishing the skin E of my new trunk-line.

With the jacket structure J described above the thermal insulating foam plastic tube is hermetically sealed by the exterior skin E. The skin E also serves as armor for the tube and facilitates handling and working with the trunk-line without the likelihood of tearing, gouging or otherwise doing irreparable harm to the soft and fragile foam plastic of which the tube is made.

In practice, the number of beer and glycol lines and the diameter of those lines that go to make up the sub-assembly A determines the cross-sectional configurations and dimension of the sub-assembly. Due to the arrangement and relative positioning of the several beer and glycol lines the sub-assembly A is polygonal in cross-section and defines a plurality of longitudinally extending circumferentially spaced flats and intermediate ridges. In the trunk-line structure, the longitudinal ridges must establish bearing engagement with the inside of the tube of the jacket structure so that the sub-assembly is supported and held to extend centrally throughout the jacket structure from one end to the other end thereof. Accordingly, it is important that the inside diameter of the tube of the jacket structure be of a size that will result in the establishment of desired supporting engagement between the jacket structure and the sub-assembly. In practice, care is taken so that the extent to which the inside portion of the tube sub-assembly is compressed to accommodate the sub-assembly A is sought to be kept at a minimum. In some instances the whole of the exterior of the subassembly is contacted by the inner surface of the tube while in other instances, contact between the sub-assembly and the inside surface of the tube is along circumferentially spaced longitudinal lines.

In FIGS. 6, 7, and 8 of the drawings I have shown the cross section of three trunk-lines that include different numbers of beer and glycol lines. The sub-assembly A of each is different in cross-sectional area and configuration from the other.

The ends of the beer and glycol lines B and G, at the opposite ends of the trunk-line, are extended a short distance from these related ends of the sheath and jacket structure to facilitate connecting those lines with other related fluid conducting parts and/or means.

When the several parts and/or portions of the trunk-line T are assembled as described above, dry gas is forcibly conducted through the sheath S and about the several lines therein to purge the sheath of moisture ladened air. When the moisture ladened air is purged from within the sheath, the ends of the jacket structure and the sheath are hermetically sealed by wiping, spreading or otherwise depositing a suitable, flexible sealant material 50 about and over the ends of the jacket structure, about the ends of the sheath and between the end portions of the lines that extend from the trunk-line, as shown in FIG. 4 of the drawings.

When my new trunk-line T is installed and connected with related beer and glycol supply means, glycol that is chilled to, for example, 27° F. is conducted into and through the glycol lines and beer that is, for example, chilled to 40° F. fills the beer lines and is intermittently caused to flow downstream therethrough, as beer is dispensed.

Comparison tests have been conducted with the trunk-line T that I provide and with commercially available prior art trunk-line structures in which the skin about the thermal insulating foam plastic tubes is common duct tape and in which aluminum foil is wrapped about the randomly arranged assembly of beer and glycol lines that to extend longitudinally through the tube. The beer and glycol lines of the trunk-line T and those lines of the prior art trunk-lines were connected with common kegs of beer and with common glycol chiller machines. The glycol chilling machines circulated glycol chilled to 27° F. through the glycol lines of the two trunk-lines in equal volumes and at the same rate. Beer, in kegs, chilled to 40° F. was conducted from the kegs to the upstream ends of the beer lines of the two trunk-lines. The downstream ends of the beer lines of both trunk-lines were connected with electrically actuated valves. The electrically actuated valves were electrically connected so that when a valve related to one of the beer lines of one of the trunk-lines was actuated to open, a corresponding valve connected with one of the beer lines of the other trunk-line was actuated to open. The trunk-lines tested are 125 feet long.

In those tests, beer, 940° F.; was caused to flow into and fill the beer lines of the two trunk-lines being tested and was thereafter intermittently dispensed from the dispensing valves related thereto at a rate of 64 oz. per minute for in excess of 24 hours. The beer that was conducted through the trunk-line T and dispensed from the valves related thereto was at ±40° F. while the beer flowing through the prior art trunk-line and from the dispensing valves related thereto was at ±43° F.

The trunk-line T and prior art trunk-lines used in the tests I have conducted were laid side by side, with several tight radiuses or bends and were laid to extend through both dry and wet environments and where temperatures between ±40° F. to 120° F. were encountered.

Following each of the tests the trunk-line T and the prior art trunk-lines were left in place and each was put to regular use for about 90 days; whereupon, the trunk-lines were again not to the same test that they were first subjected to. In the second tests, the temperature of the beer that flowed through and from the trunk-line T, was ±40° F.; the same temperature that it was recorded during the first test. The temperature of the beer that flowed through and from the prior art trunk-lines were dispensed, was at ±46° F. The heat insulating properties of the prior art trunk-line had notably diminished.

Subsequent to conducting the above noted tests, portions of both the trunk-lines T and the prior art trunk-lines were split open and examined. The structure of the trunk-line T, where split open, showed no signs of use or wear and tear. The portions of the prior art trunk-lines that were split open showed the aluminum foil had been torn and commenced to oxidize and that the foam plastic of the heat insulating tubes had become so saturated with water so that when pressed in ones hands, it wetted the hands.

In tests that have been conducted it has been observed that upon bending the trunk-lines of the prior art trunk-lines the heat insulating characteristics thereof is often notably decreased. It has been determined that those decreases are the result of the displacement and rearrangement of the beer and glycol lines that extend through those trunk-lines when they are bent. In the case of my new trunk-line T no amount of bending thereof has caused the beer and glycol lines to move or become displaced and no significant change in its heat isolating characteristics have been observed.

To the best of my knowledge and belief no one before me has produced a trunk-line structure wherein the several beer and glycol lines are set and remain in that predetermined position relative to each other where a most effective and efficient exchange of heat there between is assured; where the beer and glycol lines are securely held and maintained in their predetermined position relative to each other by a non-heat conducting radiant heat-reflecting sheath; where the sheath hermetically seals the beer and glycol lines within the thermal insulating foam plastic tube; and, wherein the exterior of the tube is hermetically sealed by an outer skin.

Having illustrated and described only typical preferred forms and embodiments of my invention I do not wish to be limited to the specific details herein set forth but wish to reserve to myself any modifications and/or variations that might appear to those skilled in the art and which fall within the scope of the following claims.

Having described my invention I claim:

1. An improved trunk-line comprising a plurality of elongate beer lines and glycol lines made of flexible plastic tubing in parallel juxtaposition; an elongate sheath of high tensile strength, tear resistant, impervious flexible plastic material tightly engaged about and extending longitudinally of the assembly of beer and glycol lines and holding the lines in set position relative to each other; an elongate tube of soft, flexible, resilient, thermal insulating foam plastic material engaged about and extending longitudinally of the sheath; and, a skin of impervious, soft, flexible and resilient plastic material about and extending longitudinally of the tube, the plastic materials of which the parts of the trunk-line are established have low indexes of heat conductivity.

2. The improved trunk-line set forth in claim 1 wherein the several beer and glycol lines are substantially cylindrical in cross-section and are positioned so that each tube establishes line bearing contact with each tube that is adjacent to it.

3. The improved trunk-line set forth in claim 1 wherein the glycol lines are positioned adjacent to the central, longitudinal axis of the assembly of beer and glycol lines and the beer conducting lines are positioned radially outward from said central longitudinal axis and engage, radially, outwardly disposed sides glycol lines adjacent thereto.

4. The improved trunk-line set forth in claim 1 wherein the several beer and glycol lines are substantially cylindrical in cross-section and are positioned so that each line establishes line bearing in contact with each line that is adjacent to it; the sheath has a radially, inwardly disposed inside surface with a pressure adhesive coating that bonds the sheath with the portions of the lines it engages.

5. The improved trunk-line set forth in claim 1 wherein the sheath is established of impervious plastic material and establishes a hermetic seal between the tube of foam plastic at its exterior and the assembly of beer and glycol lines at its interior.

6. The improved trunk-line set forth in claim 1 wherein the skin about the tube of foam plastic is impervious and hermetically seals the exterior surface of the tube.

7. The improved trunk-line set forth in claim 1 wherein the sheath is established of impervious plastic material and establishes a hermetic seal between the tube of foam plastic at its exterior and the assembly of beer and glycol lines at its interior; the skin about the tube is impervious and hermetically seals the exterior surface of the tube.

8. The improved trunk-line set forth in claim 1 wherein the sheath has a substantially, radially, inwardly disposed inside surface, the inside surface of the sheath has a micro-thin deposit of radiant heat reflecting aluminum on it.

9. The improved trunk-line set forth in claim 1 wherein the sheath has a substantially, radially, outwardly disposed outside surface, the outside surface of the sheath has a micro thin deposit of radiant heat reflecting aluminum on it.

10. The improved trunk-line set forth in claim 1 wherein the sheath has a radially, inwardly disposed inside surface and a radially outwardly disposed outside surface, the inside and outside surfaces of the sheath have micro thin deposits of radiant heat reflecting aluminum on them.

11. The improved trunk-line set forth in claim 1 wherein the sheath has a radially, inwardly disposed inside surface and a radially outwardly disposed outside surface, the inside and outside surfaces of the sheath have micro thin deposits of radiant heat reflecting aluminum on them; the several beer and glycol lines are substantially cylindrical in cross-section and are positioned so that each establishes line bearing contact with each line that is adjacent to it.

12. The improved trunk-line set forth in claim 1 wherein the sheath has a radially, inwardly disposed inside surface and a radially outwardly disposed outside surface, the inside and outside surfaces of the sheath have micro thin deposits of radiant heat reflecting aluminum on them; the several beer and glycol lines are substantially cylindrical in cross-section and are positioned so that each establishes line bearing contact with each line that is adjacent to it; the glycol conducting lines are positioned adjacent to the central longitudinal axis of the assembly of beer and glycol lines and the beer lines are positioned radially outward from said longitudinal axis and engage radially, outwardly disposed sides and adjacent glycol lines.

13. The improved trunk-line set forth in claim 1 wherein the sheath has a radially, inwardly disposed inside surface and a radially outwardly disposed outside surface, the inside and outside surfaces of the sheath have micro thin deposits of radiant heat reflecting aluminum on them; the several lines are substantially cylindrical in cross-section and are positioned so that each establishes line bearing contact with each line that is adjacent to it; the glycol conducting lines are positioned centrally within the assembly of lines and the beer lines are positioned radially outward from the glycol lines; the sheath is impervious and establishes a hermetic seal between the tube about its exterior and the assembly of lines at its interior; the skin about the foam plastic tube is impervious and hermetically seals the exterior surface of the tube.

14. The improved trunk-line set forth in claim 1 wherein the sheath is made of an elongate, impervious, thermal-set plastic ribbon with inside and outside surfaces and has a pressure adhesive coating on its inside surface; the ribbon is helically wrapped about the assembly of lines with its opposite edge portions in overlapped engagement with each other and hermetically sealed and bonded together by the adhesive coating.

15. The improved trunk-line set forth in claim 1 wherein the sheath is made of an elongate, impervious, thermal-set, plastic ribbon with inside and outside surfaces and has a pressure adhesive coating on its inside surface; the ribbon is helically wrapped about the assembly of lines with its opposite edge portions in overlapped engagement with each other and hermetically sealed and bonded together by the adhesive coating, the coating on the ribbon bonds the ribbon with the lines it contacts; the skin about the foam plastic tube is made of an elongate, impervious plastic tape with inside and outside surfaces and has a pressure adhesive coating on its inside surface, the tape is helically wound about the exterior of the tube with its opposite edge portions in overlapped engagement with each other; the pressure adhesive backing bonds and hermetically seals the lapped edge portions of the tape together and bonds the tape to the exterior surface of the tube.

* * * * *